Figure 2:
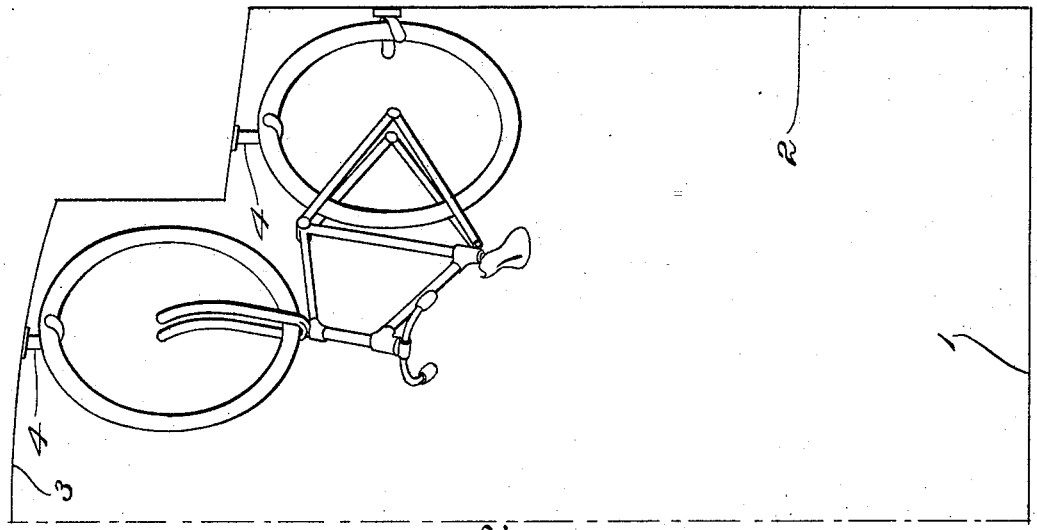

(No Model.) 2 Sheets—Sheet 1.

G. H. WILLIAMS.
BICYCLE SUPPORT.

No. 603,519. Patented May 3, 1898.

Witnesses:
Oscar F. Hill
Lepine Hall Rice

Inventor:
George H. Williams
by Macleod Calver & Randall
Attorneys.

THE NORRIS PETERS CO., PHOTO-LITHO., WASHINGTON, D. C.

(No Model.) 2 Sheets—Sheet 2.

G. H. WILLIAMS.
BICYCLE SUPPORT.

No. 603,519. Patented May 3, 1898.

Witnesses:
Oscar F. Hill
Lepine Hall Rice

Inventor:
George H. Williams
by Macleod Calver Randall
Attorneys.

UNITED STATES PATENT OFFICE.

GEORGE H. WILLIAMS, OF NEWTON, MASSACHUSETTS.

BICYCLE-SUPPORT.

SPECIFICATION forming part of Letters Patent No. 603,519, dated May 3, 1898.

Application filed April 22, 1897. Serial No. 633,253. (No model.)

*To all whom it may concern:*

Be it known that I, GEORGE H. WILLIAMS, a citizen of the United States, residing at Newton, in the county of Middlesex and State of Massachusetts, have invented certain new and useful Improvements in Bicycle-Supports, of which the following is a specification, reference being had therein to the accompanying drawings.

The invention is intended for application to railway-cars in order to facilitate the storing of bicycles therein and to enable them to be transported conveniently and safely. The question of storing bicycles within railway-cars during transportation is one of very great importance and also presents very serious difficulties. It is necessary to exercise great care in order to avoid injury to the bicycles while they are in the cars, since they are very liable to become broken or scratched, and their size, shape, construction, and proportions are such that they obstruct very seriously the space within a car when stored according to the methods which have been in vogue heretofore. In the past it has been found difficult to keep the enameled parts from becoming scratched and also difficult to avoid breakage, as well as to keep them in the required position and to utilize the storage-space of a car economically and advantageously. A small number of bicycles in a car will take up the space which otherwise would hold a very considerable quantity of ordinary baggage.

In accordance with my present invention I utilize hooks or hangers which are applied to the ceiling of a railway-car and which engage with the rims of the wheels of a bicycle in such manner as to hold the bicycles in inverted position depending from the ceiling. With the object in view of obviating the tendency of the bicycle to swing or oscillate in response to jars or impulses such as are received during the movement of the car I provide a means of holding the bicycle so as to prevent swinging movements thereof.

The invention will be described first with reference to the accompanying drawings, in which I have illustrated the best practical embodiment of the invention which has yet been contrived by me, and afterward the distinguishing characteristics thereof will be particularly pointed out and distinctly defined in the claims at the close of this specification.

Figure 1:
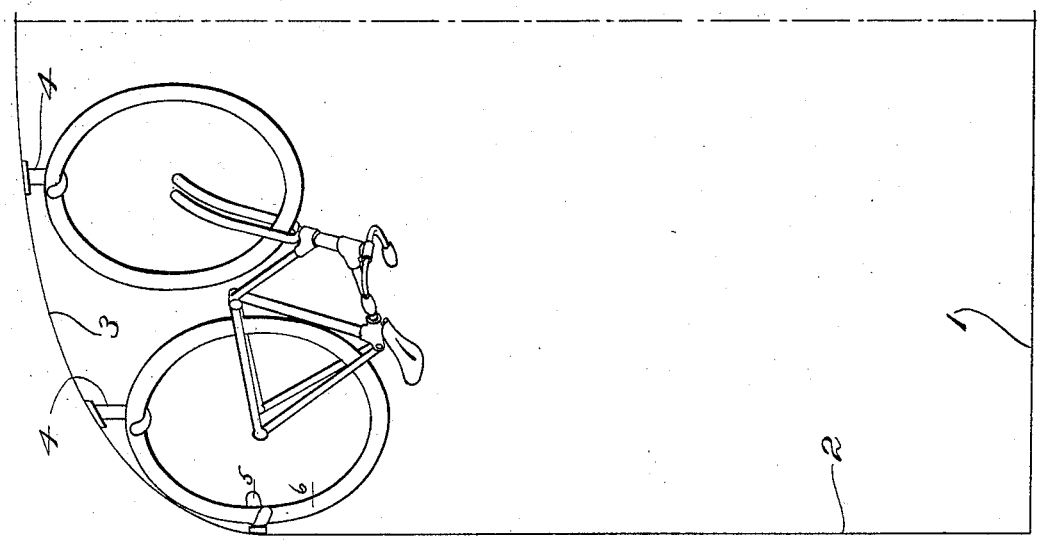
Figure 3:
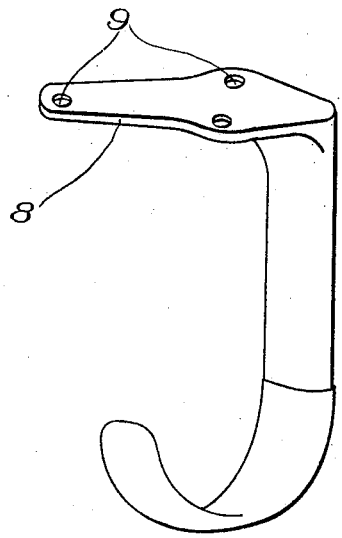
Figure 4:
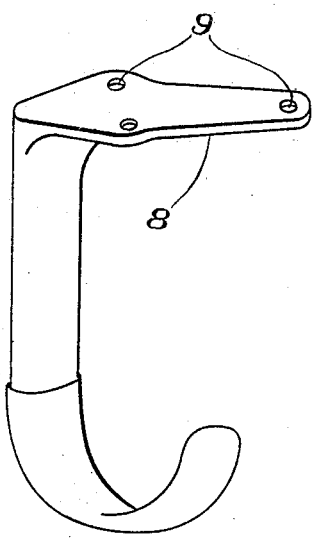
Figure 5:
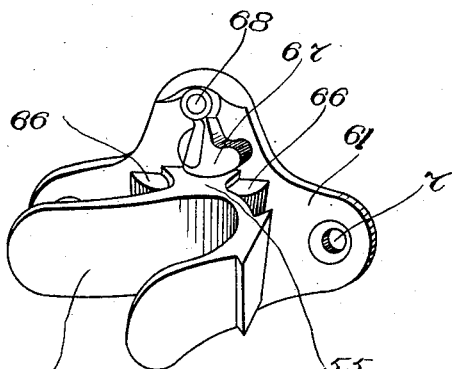
Figure 6:
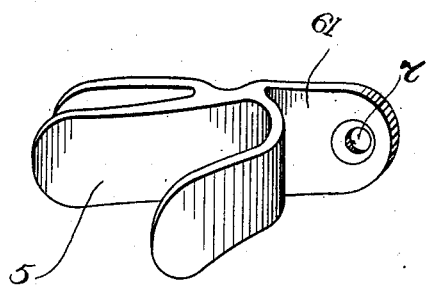

In the drawings, Figure 1 shows in transverse section one-half of the width of the car with the said embodiment of my invention in place therein and illustrates a bicycle supported in the manner which is referred to above. The said figure shows a car having the usual round or curved top. Fig. 2 is a similar view illustrating the application of the invention to a car having the well-known monitor top. Figs. 3 and 4 show views of one of the ceiling-supports. Figs. 5 and 6 show views of the device which I employ for preventing swinging movements of the bicycle.

1 designates the floor of a car, 2 the vertical side wall thereof, and 3 the roof or ceiling. The foregoing parts are shown merely in outline, further illustration thereof being unnecessary for the purposes of the present case.

4 4 are ceiling hooks or hangers which are secured to the ceiling 3, with the hooked portions thereof pendent and in position to engage with the rims of the wheels of a bicycle. The said hooks or hangers are spaced apart at a distance equal to the length of the tread of the bicycle, so that each thereof may be engaged with the rim of the corresponding wheel of a bicycle, as indicated clearly in Figs. 1 and 2, the bicycle hanging in inverted position, as shown.

A bicycle suspended by hooks, as indicated in Figs. 1 and 2, is susceptible of swinging or oscillating in a direction transverse to its length in response to impulses derived from the movements of the car. For the purpose of preventing such swinging or oscillating movements I combine therewith a retainer 5, which I apply in position to engage with one of the wheels 6 6 of the bicycle at a point which is removed some distance vertically from the point at which the same wheel is engaged by the corresponding ceiling hook or hanger 4. In the present case the hooks 4 4 are arranged in a position to support the bicycle with its length directed transversely of the car. With this arrangement the retainer 5 is applied to the vertical wall 2. Preferably I give the retainer 5, when thus applied to said wall, the U shape or fork shape which is shown in the drawings (see more particularly Figs. 5 and 6) in order to facilitate the application of the wheel 6 thereto. The sides or lip of the fork spread apart somewhat toward their free ends in the illustrated form thereof, so as to constitute a flaring mouth, in order that the rim of the wheel with its tire may the more readily find its way into place. The retainer 5 has a base 6, which is formed with holes 7 for the passage of the screws or other fastening means by which it is held in position on the vertical wall 2 of the car. Correspondingly each of the ceiling hooks or hangers 4 has a base 8, that is shaped to fit against the surface of the ceiling 3 of the car and formed with holes 9 for the passage of the screws or other securing means by which it is held in place.

In practice I contemplate usually locating the ceiling hooks or hangers for each bicycle on a line which is inclined relatively to the length of the car, ordinarily at an angle of forty-five degrees, so that the bicycle after being applied to the said hooks or hangers shall occupy a diagonal position, as indicated in the drawings. This enables a series of bicycles to be suspended close together, overlapping one another laterally. The lateral inclination enables the handle-bars, &c., to lap past one another without interfering with one another. To suit this disposition of the ceiling hooks or hangers and of the bicycles applied thereto, I form the fork of the retainer 5, which is applied to the wall 2, oblique—that is to say, give it a diagonal position with reference to the base 61—this enabling it to conform to the said position of the bicycle. I have experienced more or less difficulty in finding a construction of base or support for the ceiling hooks or hangers which would enable the said ceiling hooks or hangers to be applied conveniently and readily to the ceilings of the cars at present in use and enable the same to be securely held in place.

As will be perceived on reference to Fig. 1 of the drawings, the roofs of some cars are curved, while the roofs of others—namely, those which have the well-known monitor top—have practically flat surfaces. (See Fig. 2.) While a simple flat base would answer as a means of enabling a ceiling hook or hanger to be applied to the surface of the ceiling of a car having a monitor top, a special form of construction is required in order to enable the ceiling hook or hanger to be applied to a curved ceiling, such as is shown in Fig. 1, and more particularly in order to fit the same ceiling hook or hanger to be applied equally well to the form of ceiling which is represented in Fig. 2 or that which is represented in Fig. 1. A flat base or bracket could not well be applied to the curved ceiling of Fig. 1 with the length thereof or any considerable breadth thereof extending crosswise of the car, inasmuch as the upper flat surface of the base or bracket would not lie in proper contact with the curved surface of the ceiling. To overcome the difficulties and meet the practical requirements of the case, I have devised the form of ceiling hook or hanger which is illustrated in Figs. 3 and 4. In the said figure the base 8 is made somewhat narrow and the length thereof projects at an angle relatively to the lower hooked portion. In applying the said construction of hook or hanger to the curved surface of the ceiling of such a car as is intended to be illustrated in Fig. 1 the length of the base 8 is caused to extend lengthwise of the car, which enables the surface of the said base to fit closely to the surface of the ceiling. Should a base of the length which is shown in Figs. 3 and 4 be applied crosswise of the car, it is obvious that such base would touch the ceiling only at its extreme ends, while at mid-length of the base there would be a space intervening between the ceiling and the base and the hook or hanger could not be securely held in place.

When it is desired that the bicycle shall occupy a diagonal position in the car, the angular relation of the base 8 and the lower hooked portion is less than that of a right angle, while in case the bicycle is desired to hang at right angles to the length of the car—that is to say, directly crosswise of the same—the said base 8 and the lower hooked portion of the hook or hanger stand parallel with each other.

The base 8 of the hanger which is shown in Figs. 3 and 4 will fit satisfactorily against the flat or substantially flat surfaces of the ceiling of the form of car which is represented in Fig. 2 in whatever position the hook or hanger may be placed.

In order to obviate all objections, such as would be incident to the existence of projections on the sides of the car which would either interfere with the placing of baggage against said sides or would be liable to occasion injury to the baggage, I contemplate in some cases making the fork of the wall-retainer removable, so as to enable the projecting fork to be removed when it is not desired to have it in place for engagement with a bicycle, leaving only the flat base in position. Thus in Fig. 5 I have shown the base as formed with a dovetailed socket having vertical sides 66 66 to receive a dovetailed key or projection 55 at the rear of the fork. To guard against accidental removal of the fork from the base, I equip the latter with a locking device or key, here shown as consisting of a swinging thumb-piece 67, which is pivoted upon a pin 68 on the base above the socket aforesaid, and adapted to fall by gravity into a position such as that which is shown in Fig. 5, wherein it holds the projecting portion or fork of the holder locked in position until purposely sprung aside to permit of the removal of the fork by hand.

I do not herein lay claim to the separable construction and the locking device or key which have just been described, for the same are made the subject of claim in another application filed by me of even date herewith.

I claim as my invention—

1. The combination with a car, of hooks or hangers applied to the ceiling of the car and adapted to support a bicycle in inverted position depending from the said ceiling, and a retainer engaging with the bicycle to prevent swinging or oscillating movement thereof, substantially as described.

2. The combination with a car, of hooks or hangers applied to the ceiling and adapted to engage with the rims of the wheels of a bicycle to hold the bicycle in inverted position depending from the ceiling, and a retainer also engaging with one of the said wheels to prevent the bicycle from swinging or oscillating, substantially as described.

3. The combination with a car, of hooks or hangers applied to the ceiling and adapted to engage with the rims of the wheels of a bicycle to hold the bicycle in inverted position depending from the ceiling, and the retainer applied to one of the vertical sides of the car, and also engaging with one of the said wheels to prevent the bicycle from swinging or oscillating, substantially as described.

4. The combination with a car, of hooks or hangers applied to the ceiling of a car, arranged in a diagonal line crosswise of the car, the said hooks or hangers being adapted to engage with the rims of the wheels of a bicycle to hold the bicycle in inverted position depending from the ceiling, and the retainer applied to one of the vertical sides of the car and also engaging with one of the said wheels to prevent the bicycle from swinging or oscillating, the said wall-retainer having its fork disposed in an inclined position, substantially as described.

5. The herein-described ceiling hook or hanger having the elongated base disposed at an angle to the hook portion to facilitate the application of the hook or hanger to the surface of a curved ceiling, substantially as described.

In testimony whereof I affix my signature in presence of two witnesses.

GEORGE H. WILLIAMS.

Witnesses:
CHAS. F. RANDALL,
WM. A. MACLEOD.